Figure 1:
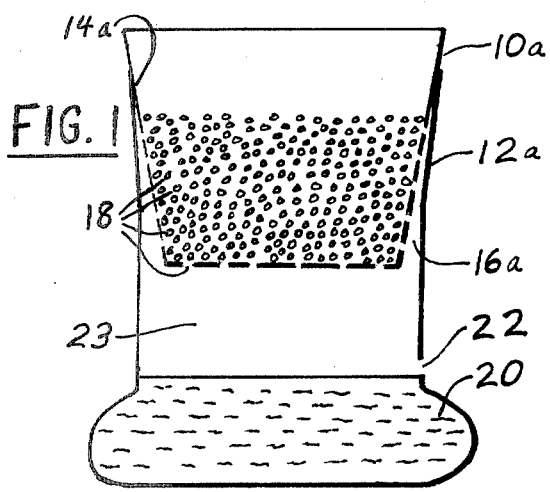

United States Patent [19]

Carlisle

[11] 4,179,846

[45] Dec. 25, 1979

[54] HORTICULTURAL DEVICES

[76] Inventor: Richard S. Carlisle, P.O. Box 307, Rye, N.Y. 10580

[21] Appl. No.: 836,978

[22] Filed: Sep. 27, 1977

[51] Int. Cl.² ............................................. A01G 31/00
[52] U.S. Cl. ........................................ 47/59; 47/66; 47/73; 47/79; 47/80
[58] Field of Search .............................. 47/67, 70-74, 47/78-82, 62, 59, 66, 39, 77

[56] References Cited

U.S. PATENT DOCUMENTS

| 54,068 | 6/1895 | Myers | 47/67 X |
|---|---|---|---|
| 265,097 | 9/1882 | Johnston | 47/81 |
| 586,485 | 7/1897 | Guyn | 47/77 |
| 1,200,396 | 10/1916 | Southard | 47/74 |
| 2,205,303 | 6/1940 | Munsell | 47/80 X |
| 2,249,197 | 7/1941 | Brundin | 47/80 X |
| 2,949,699 | 8/1960 | Lapetina et al. | 47/74 |
| 3,613,309 | 10/1971 | Coburn | 47/39 X |
| 3,823,508 | 7/1974 | Takehara | 47/39 X |
| 4,106,235 | 8/1978 | Smith | 47/59 |

FOREIGN PATENT DOCUMENTS

| 661013 | 7/1929 | France | 47/79 |
|---|---|---|---|
| 9067922 | 6/1954 | France | 47/80 |
| 11337 | of 1846 | United Kingdom | 47/70 |
| 10480 | of 1891 | United Kingdom | 47/79 |
| 12354 | of 1896 | United Kingdom | 47/78 |

Primary Examiner—E. H. Eickholt

[57] ABSTRACT

There are disclosed several features of a container of particulate plant-growing material, and a supporting member surrounding the container, to be used with or combined with a container of plant-sustaining liquid such as water or a hydroponic solution. In one form, the liquid container is incorporated in the supporting member itself. In another form of the disclosed horticultural device, the supporting member is open at its bottom and rests on a tray of liquid. In a distinctive form, the supporting member and the first container are removably received as a closure in the mouth of a second container of plant-sustaining liquid.

Roots of a growing plant project through the bottom and sides of the first-mentioned container and downward through an air-space, then into the liquid, uniting the plant and the first container. To special advantage the first container is a pot made of peat moss or other fibrous material having interstices for penetrating roots, the material of the pot yielding to accommodate thickening of the roots.

In one form, the liquid container is suspended by means secured to an upper portion of the container, extending upward to hang-up means. A loop holds the plant stem near the suspension means to prevent the plant from toppling.

10 Claims, 4 Drawing Figures

HORTICULTURAL DEVICES

The present invention relates to horticultural devices, particularly of the class wherein plants are sustained by water or a hydroponic solution.

BACKGROUND OF THE INVENTION

Over a period of many years, perhaps centuries, plants have been grown in arrangements providing the roots with various hydroponic solutions. It has become a widely accepted practice to support the plant above the liquid with portions of its roots extending through an air space. Usually the support comprises a wire net or a pot of plastic or other material having holes of ample size to be penetrated by the roots. A mass of rough material such as gravel or peat moss on or in the support anchors the roots and thereby anchors the plant. Usually if not invariably the plant is started elsewhere from seed and then transplanted to the hydroponic device.

SUMMARY OF THE INVENTION

An object of the present invention resides in providing novel horticultural devices for germination of seeds and thereafter for growing of the resulting plants utilizing hydroponic solutions.

A further object of the invention resides in the provision of novel horticultural devices especially suited to individual plants.

An additional object related to the foregoing resides in providing novel horticultural devices utilizing hydroponic liquid, that have features facilitating care and promoting success when attended by those who may be relatively unskilled.

A still further object resides in the provision of novel horticultural devices utilizing hydroponic nutrients, primarily useful for sustaining individual plants year-round in an ordinary home environment, particularly food-bearing plants, i.e., tomatoes and peppers.

The foregoing and other objects of the invention in its various aspects are achieved variously by a number of horticultural devices shown in the accompanying drawings and described in detail below. Briefly, a container of soil or other particulate seed-germinating and plant-growing material has apertures in its bottom and side walls for penetration by roots. In one aspect of the invention, a pot or other container of soil or other particulate material (conveniently called a "soil container" for reference) is tapered to have gradually reduced cross-section downward, and a member of root-impervious material surrounds the soil container, engaging and supporting an upper portion of the soil container while lower portions of the supporting member and the soil container are spaced apart by separation that increases gradually downward. Roots emerging from the side wall of the soil container turn down in the space between the soil container and the surrounding member. At an upper level of that space, a few roots may emerge from the soil container, then turn down. At each successively lower level, a few more roots may emerge and turn down. Thus, the aggregate number of roots in the space between the side walls of the soil container and the surrounding member increases progressively downward. The roots that emerge from the soil container and extend downward in the downward-increasing space, utilize that space efficiently. The tapered side wall of the soil container provides an extensive area for laterally extending roots to emerge and the volume of soil which can be contained can be ample for germination of seeds. At the region above the root-receiving space, the soil container can fit against the surrounding member for reinforcing the soil container and for supporting the soil container at a desired position, vertically, in the surrounding member.

The soil container may be soft when wet, for example when it is formed of pressed peat moss. In the course of their growth, the sheer weight of many kinds of plants might force the soil container to sink downward within the surrounding member. This objectionable downward shift is usually limited, if not prevented entirely, by the laterally extending roots. Those roots grow outward until they bear against the side wall of said surrounding member, and then the roots turn, usually downward. The cumulative effect of those laterally extending roots bearing against the surrounding member usually blocks the downward displacement of the soil container or, at any rate, limits that displacement to a very small distance. For this purpose, the cross-section of the surrounding member diminishes downward. For other reasons, it may taper more gradually than the soil container.

The soil container is best made of fibrous material such as compacted peat moss, papier mache or a fabric or net so as to be apertured for penetration by roots, and to contain the soil or other particulate material suitable for growing plants, and to be yielding to accommodate the thickening of the roots that extend therethrough. Especially with this kind of soil container, the surrounding member provides reinforcement where the two fit together.

In a simplified horticultural device combining a soil container and a surrounding member as outlined above, the latter member (in one form) extends below the soil container and is itself formed as a hydroponic liquid container. In another form the surrounding member has an open bottom, intended to rest on a tray of plant-sustaining liquid. In both forms, the surrounding member extends below the bottom of the soil container sufficiently to support the soil container and to provide for an air space for portions of the roots between the liquid level and the bottom of the soil container.

In the preferred embodiment described below, the soil container and the surrounding member together form a unit which acts as a closure for the mouth of a container (conveniently called a "liquid container" for reference) for water or a hydroponic solution. This unit is readily removable from the mouth when liquid in the container is to be changed or replenished. The surrounding member shields the roots from harm, especially during removal and replacement of said unit. By extending the surrounding member below the bottom of the soil container, the roots are protected against unintentionally being bent sharply at their point of emergence through the soil-container wall during the removal and replacement procedure. A hole in the wall of the liquid container below the bottom of the soil container ensures an air space being formed for portions of the roots. In case of unintentional excessive filling of the liquid container, the excess liquid flows out through the hole. In addition, the hole allows some slow ventilation of the air space, which promotes development of root hairs in the air space.

The roots of a plant tend to become fixed in the particulate material and in the wall of the soil container, and thus anchor the base of the plant. The anchoring of the plant is enhanced especially by roots which emerge through the container wall at points laterally opposite the stem base, just below the surface of the particulate material.

A single line or a group of lines can be fixed to the hydroponic liquid container and the lines can then extend upward to a means for hanging up the whole horticultural device. A loop is provided, encircling the line or lines and an upper portion of the plant. In this way, even a tall plant is prevented from toppling, the whole device constituting a unique planter for tall plants that is quite stable when suspended opposite a window. The stability is enhanced by use of a tall hydroponic liquid container, with the suspension lines secured near its top.

So-called "organic" methods of plant culture can be implemented using features of the invention. The reservoir can contain plain water. Periodically, organic nutrients can be applied to the particulate material. The particulate material tends to dry out in the course of a day, partly by evaporation directly from the surface of the particulate material and partly because of the extraction of moisture by the roots. Drying of the particulate material interrupts putrefaction of the organic nutrient in the particulate material. The plant is sustained by the water in the reservoir during the times when the particulate material is too dry to sustain the plant.

The nature of the invention, including the foregoing and other objects, novel features and advantages, will be more fully appreciated from the accompanying drawings and the following detailed description of a number of embodiments variously illustrating those features.

Figure 2:
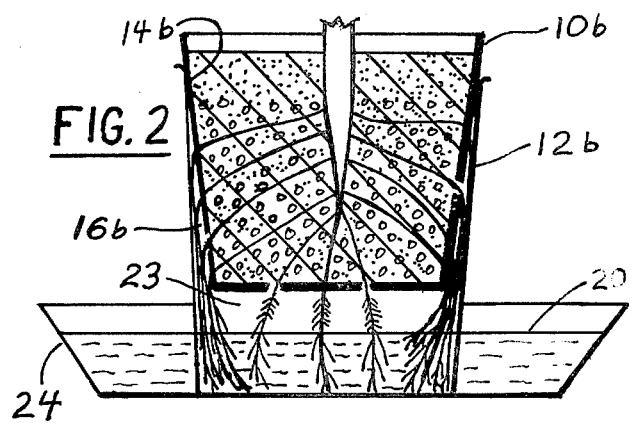
Figure 3:
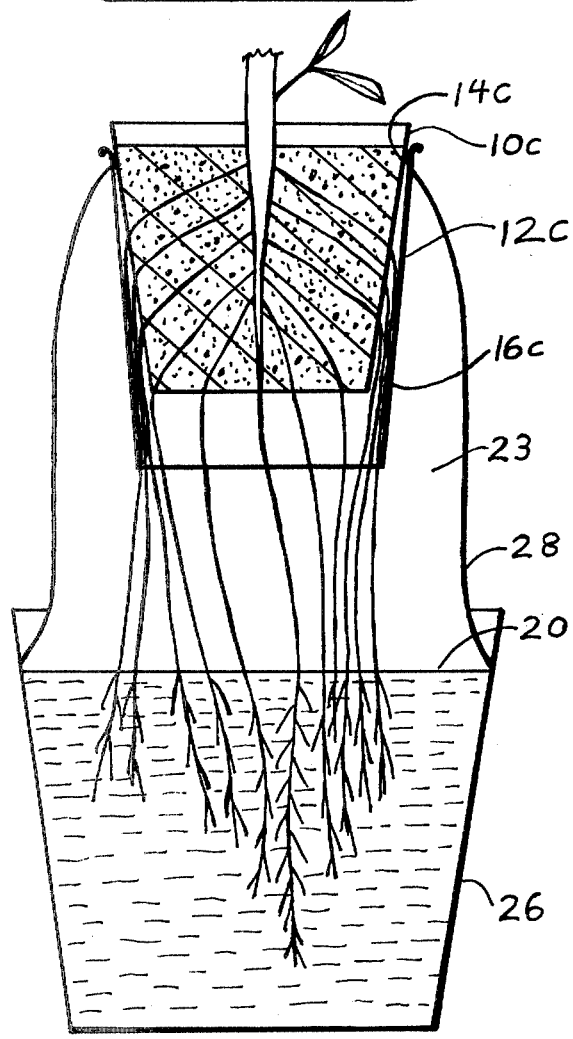

FIGS. 1-3 of the drawings are vertical cross-sections of different horticultural devices drawn to reduced scale, being illustrative embodiments of various features of the invention.

Figure 4:
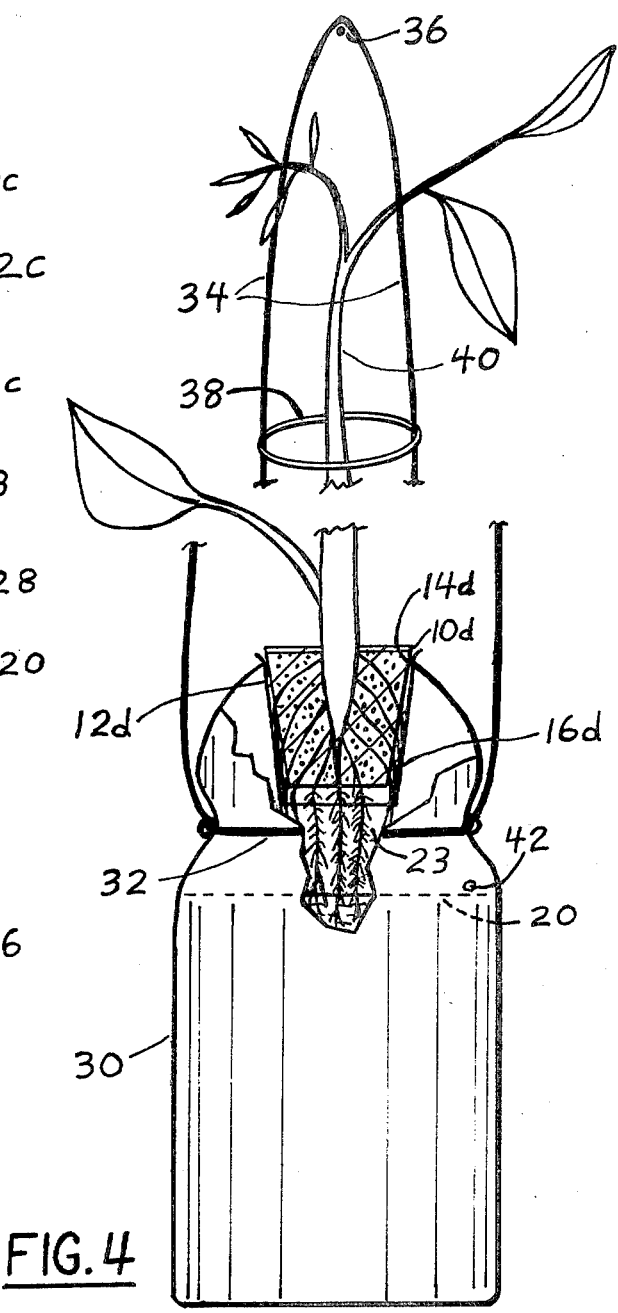

FIG. 4 is a front view of a presently preferred embodiment of various aspects of the invention, portions being broken away to show the upper portion of the device in vertical cross-section.

THE ILLUSTRATIVE EMBODIMENTS

Each of the embodiments illustrated includes a soil container 10a, b, c, and d, and a surrounding member 12a, b, c and d fitted to a small upper portion 14a, b, c and d of the soil container. Below said upper portion, a space 16a, b, c and d is formed between the surrounding member and the side wall of the soil container for downward growing roots. The soil container can be made of a solid material, for example, injection molded or blow-molded plastic having numerous perforations, or it can be made of net material, or as a distinctive feature, the soil container in each example can be made of yieldable fibrous material such as compacted peat moss or papier mache having microscopic interstices through which roots can extend and then grow in cross-section.

The soil containers in these illustrative embodiments are approximately 0.02 to 0.05 inch thick, 2½ inches in diameter at the top, 1⅝ inches in diameter at the bottom, and 2½ inches in height.

In FIG. 1, soil container 10a as illustrated is of plastic material, having a vast number of holes 18 in its side and bottom walls. These holes may be about 1/16 to ⅛ inch in diameter. They should be large enough for the developed roots of a plant—which vary widely—yet small enough to contain soil or a mixture of soil and other materials such as sand, loose peat moss, fine crushed stone, pearlite, etc. Surrounding member 12a is illustrated as having a cylindrical side wall and a bottom wall, formed of a material suitable for containing plant-sustaining liquid such as water or a hydroponic solution 20. A hole 22 is formed in the side wall below the bottom of the soil container. In the event that liquid is poured into member 12a to a level above this hole, or if liquid such as rain enters container 12a through member 10a, enough of it will drain through the hole to ensure developing an air space 23, as shown, between the bottom of the soil container and the surface of the liquid. In FIG. 1, member 12a serves the purposes of supporting the soil container, serving additionally as a reservoir, and providing a confined air space of substantially 100% humidity below the bottom of the soil container.

Roots that emerge through the side wall of soil container 10a grow outward and then turn or bend abruptly at the side wall of member 12a. That wall is either cylindrical, or it can taper to have progressively greater cross-sections at higher levels. In that case, it is easy to lift pot 10a partly or wholly out of support and liquid container 12a, for refilling or replacing the liquid, or for flushing the roots at intervals. It is relatively easy to reinsert pot 10a into liquid container 12a afterward.

In FIG. 2, soil container 10b is shown as being identical to that in FIG. 1. Surrounding member 12b has a taper, but its taper is less than that of the soil container so that a separation between the two at the bottom level of the soil container is about ⅛ inch in an example. A tray 24 serves as a container or reservoir of plant-sustaining liquid. Member 12b extends below the bottom of the soil container sufficiently to allow for an air space above the liquid in the tray. The bottom of member 12b is open and rests on tray 24 in a way that allows water to enter. Root hairs are shown on the roots in the humid air space. The rim of the tray is below the bottom of the soil pot.

In FIG. 3, soil container 10c is of peat moss. In an example, it is proportioned to contain about 4 to 6 ounces of soil, to provide for germination of a seed and for early development of a plant. During this period it is necessary to water the soil from the top. In later stages of plant development, the roots extend to the liquid in container 26.

Member 12c is of imperforate blow-molded plastic, and extends below the bottom of member 10c. A liquid container 26 has a tapered side wall that tightly receives the lower edge of member 28. Container 26 and member 28 together constitute a reservoir, supporting the soil container 10c and its surrounding member. An ample air space 23 is formed within member 28, extending partway into container 26. The fit between parts 26 and 28 may advantageously form an opening for escape of excess liquid that might accumulate when the plant is left out in prolonged rain. Member 28 can readily be removed from container 26 to inspect the liquid, add to it, or change it. Member 28 has an upper mouth that is closed by the unit consisting of parts 10c and 12c. That unit can be lifted out of member 28. Member 12c serves to protect the roots against being scraped and against being bent sharply at the points where they emerge from the side wall of the soil container. Member 12c also reinforces the soil container where they fit together. The removable unit 10c, 12c can also be removed with the plant it contains, to be transplanted to soil outdoors. The same unit can later be removed from outdoor soil and returned to member 28, first trimming away excess root growth and rinsing the remainder.

A seed can be planted in the soil or soil mixture in container 10c. At this phase, the soil level should best be well below (one inch or more) the upper edge of the soil container. The soil can be watered and nourished with hydroponic solution during germination of the seed and development of the root system. When the seedling has developed sufficiently, soil may then be added to fill or nearly fill the soil container. At this point, a ¼ inch layer of light-color gravel may be applied to the particulate material to reflect sunlight and in that way to impede excessive surface-temperature build-up, and to impede evaporation of moisture from the surface.

Roots develop laterally and extend through the side wall of the soil container, here a "peat pot." A few roots extend through the pot wall just below the portion of the pot gripped by surrounding member 12c. These roots turn down. At successively lower levels, more roots grow outward through the side wall of the peat pot, and turn down. At successively lower levels, the number of roots increase, and they are freely received in the space between the peat pot 10c and member 12c, this space increasing progressively downward. The peat pot nevertheless has a large volume to contain soil and a large surface area through which roots can emerge.

The developing roots extending through the walls of the peat pot can become thicker as they become longer. The yielding fibrous quality of the peat pot accommodates this thickening of the roots. The peat pot, papier mache or other similar materials for the soil container, allow watering of the soil from above without any noticeable transfer of soil into the liquid of the reservoir.

FIG. 4 illustrates a further embodiment, with its own distinctive features. Parts 10d and 12d are the same as parts 10c and 12c that are described and discussed above. Jug 30 has a necked-in region near its top where it is encircled by a band 32. Two or more lines 34 secured to band 32 extend one to two feet or more above band 32 to a hook 36 or other hang-up means. A removable loop 38 encircles lines 34 and the stem 40 of a plant.

A hole 42 limits the maximum level of the liquid, whether it enters slowly via the soil or whether it be poured into the container through its mouth. Liquid can be poured into container 30 by removing unit 10d, 12d entirely from the mouth of container 30. However, because of the taper of member 12d, an opening develops when unit 10d, 12d is removed partially, lifted one to two inches, thereby allowing ample space for pouring liquid into the reservoir.

In FIG. 4, root hairs are shown well developed on the roots in the humid air space 23 above the liquid, for effective exchange of gasses (absorbing oxygen and emitting carbon-dioxide).

Roots in peat pot 10d become anchored in the soil and in the side walls and bottom of the pot. This provides a remarkable degree of support for the plant, resisting toppling. The same comment applies to FIG. 3. In both cases, the plant and its unit 10, 12 fits tightly in its receiving mouth, and is relatively secure. However, the hang-up arrangement 34, 36, 38 of FIG. 4 has the advantage of guarding very tall plants, 1½ feet or taller, against toppling. The jug 30 is much taller than it is wide. Where the jug is at least twice as tall as the average width, the unit can be dimensioned to be compactly suspended close to a window, and so that the internal volume will be sufficient for sustaining a plant for a relatively long time period between refillings. The liquid nutrient acts as ballast, like the keel of a ship, in maintaining the reservoir erect, especially when the suspension lines are secured near the top of the reservoir. The arrangement of a vertically elongated device provided with suspension means enabling the plant to be hung close to a window, greatly increases the number of places available in a home for growing plants, and maximizes the amount of direct sunlight exposure for the plant. Such direct exposure is particularly important for the cultivation of food crops such as tomatoes.

In FIGS. 2, 3 and 4, the member 12b, 12c or 12d which surrounds the soil pot is tapered to have progressively reduced horizontal cross-section. Roots grow laterally through the side wall of the soil pot and then bend or turn, downward usually, where they engage the surrounding member. When the plant is small, the pot is supported sufficiently by being gripped by a portion of the support member. The plant may well become heavy as it matures. This weight bears down on the soil pot. The effect of that downward pressure is resisted with remarkable effectiveness by cooperation of the laterally extending roots with the surrounding support member. If desired, members 12b, 12c and 12d can have vertical ribs or corrugations, to bear against the tapered wall of the soil pot, as another means to resist settling of pot 10a (etc.) into the liquid container, while providing a protected region for roots outside the side wall of the pot.

After root development of a young plant has progressed so that one or more roots have reached the liquid, watering from the top can be done intermittently and sparingly to provide a relatively dry condition in the soil container, in order to promote root growth downward in the humid air space below the plant pot, and thence to the liquid in the reservoir.

It has been noted that members 12a, b, c and d which surround the soil container are formed, for example, of injection-molded or blow-molded plastic. The wall is thin and flexible in response to laterally applied pressure, but it is stiff in resisting pressure applied to an edge of the material as in FIG. 2.

The detailed description of various illustrative embodiments of the novel aspects of the invention, appearing above, will naturally be subject to a latitude of modification by those skilled in the art. Therefore the invention should be construed broadly, in accordance with its full spirit and scope.

What is claimed is:

1. The method of hydroponic plant culture, including steps of planting a seed in particulate plant-growing material in a first container containing such material, said first container having a side wall and a bottom of yieldable fibrous material both of which accommodate root penetration and enlargement of root cross-section but which are essentially free of through openings penetrable by the particulate plant-growing material and the transverse dimensions of the first container being so limited in relation to the plant as to be readily accessible for penetration by laterally growing roots;

supporting said first container above hydroponic liquid in a hydroponic liquid container with the side wall of the first container spaced from surrounding root-confining means and with the bottom of the first container spaced above and freely exposed to nutritive hydroponic liquid in the hydroponic liquid container;

maintaining the space about the sides and bottom of the first container and above the liquid largely sealed for developing substantially 100% humidity in that space and maintaining the particulate material suitably moist while the seed germinates and while the resulting seedling develops a stem having a downward extension in the particulate material for inducing development of roots extending downward and through the bottom of said first container and for additionally inducing development of roots sidewise from said downward extension projecting outward to and through said side wall of the first container at a range of depths in the particulate material starting just under the surface thereof, thereby to develop outward-extending anchored supports for the plant at a range of depths in the particulate material and through the side wall of the first container; and after such root development has occurred, continuing the development of the plant hydroponically by utilizing said nutritive hydroponic liquid and said 100% humidity.

2. The method of claim 1, further including the step of directing downward those roots which extend laterally outward through the side wall of the first container.

3. A horticultural device useful in seed germination and growth of plants, including a container formed of fibrous material comprising a surrounding side wall and a bottom for containing a particulate growing medium, wherein roots including a central root can grow down and through interstices in the bottom of the container and wherein roots including those extending outward from the central root can grow to and through interstices in the side wall, the material of the wall serving to anchor roots extending therethrough and the fibrous material being yieldable to accommodate thickening of the roots extending through said container, and an at least largely bottomless supporting member comprising a side wall of relatively stiff root-impervious material surrounding said side wall of the fibrous material container and having an upper portion thereof fitted to an upper portion of said container for enabling the supporting member to support the container and forming a reinforcement therefor, said supporting member extending downward opposite to but spaced from the remaining lower portion of said side wall of the container for providing a shield for roots emerging from the side wall of the container, and a second container for plant-sustaining liquid having an upper mouth in which the supporting member is received, said supporting member and said container of fibrous material therein occupying and forming a closure for said mouth but being readily removable therefrom whereby, when a growing plant has roots in the container extending through the side wall and the bottom of the container and extending downward therefrom, the plant and the container and the supporting member can readily be lifted out of said liquid container and restored thereto without subjecting the roots to bending or scraping stresses at points where the roots emerge through the wall of the fibrous container.

4. The method of hydroponic plant culture, including steps of planting a seed in particulate plant-growing material in a first container such material, said first container having a side wall and a bottom both of which are formed of compacted peat moss having microscopic interstices which accommodate root penetration and enlargment of root cross-section but which virtually preclude escape of the particulate plant-growing material and the transverse dimensions of the first container being so limited in relation to the plant as to be readily accessible for penetration by laterally growing roots;

supporting said first container above hydroponic liquid in a hydroponic liquid container with the side wall of the first container spaced from surrounding root-confining means and with the bottom of the first container spaced above and freely exposed to nutritive hydroponic liquid in the hydroponic liquid container;

maintaining the space about the sides and bottom of the first container and above the liquid largely sealed for developing substantially 100% humidity in that space and maintaining the particulate material suitably moist while the seed germinates and while the resulting seedling develops a stem having a downward extension in the particulate material for inducing development of roots extending downward and through the bottom of said first container and for additionally inducing development of roots sidewise from said downward extension projecting outward to and through said side wall of the first container at a range of depths in the particulate material starting just under the surface thereof, thereby to develop outward-extending anchored supports for the plant at a range of depths in the particulate material and through the side wall of the first container; and after such root development has occurred, continuing the development of the plant hydroponically by utilizing said nutritive hydroponic liquid and said 100% humidity.

5. A horticultural device including a pot for containing particulate growing material, said pot having a bottom and a side wall both apertured for penetration by downward and laterally outward growing roots, a supporting member comprising a side wall of root-impervious material surrounding the side wall of the pot and extending at least to the bottom thereof, said supporting member being open at its bottom and said supporting member cooperating with and supporting an upper portion of the pot, the side walls of said supporting member and the pot below said supported upper portion of the pot being spaced from each other for accommodating laterally outward growing roots, a container for plant-sustaining liquid having a mouth in an upper portion thereof for removably receiving said supporting member and for supporting an upper portion thereof, the cross-section of the supporting member being no larger below the supported upper portion thereof than the size of the mouth whereby the pot and the supporting member can be raised within said mouth and can be lifted out of the container as a unit, said root-impervious side wall of the supporting member protecting the roots of a plant in the pot from being scraped or sharply bent at the points of their emergence from the pot while the unit comprising the pot and the supporting member are being removed from and inserted into said mouth.

6. A horticultural device as in claim 5, wherein the cross-section of a lower portion of the supporting member is substantially smaller than the mouth so that, when the supporting member and said pot are elevated in said mouth and shifted to engage a portion of the mouth, an aperture is formed between the mouth and the supporting member through which liquid can be poured into the container.

7. A horticultural device as in claim 5, wherein the container has an over-fill preventing aperture below the bottom of said pot to define an air space therebelow of substantially 100% humidity between the maximum level of liquid and the bottom of said pot.

8. A horticultural device as in claim 5, wherein said pot is formed of fibrous material substantially impenetrable by conventional particulate plant-growing material but affording innumerable apertures penetrable and enlargeable by plant roots.

9. A horticultural device as in claim 8, wherein said pot is approximately 2½ inches in diameter at the top and approximately 2½ inches in height to be readily accessible for penetration by outward and downward growing roots.

10. A horticultural device as in claim 5 wherein said pot and said supporting member are both tapered downward and the taper of the pot being more prominent than that of the supporting member to provide space for laterally outward root growth as aforesaid outside the side walls of the pot and within the surrounding supporting member, the taper of the supporting member being effective in cooperation with said mouth to form an aperture when the pot and its supporting member are raised in the mouth.

* * * * *